US007807207B2

(12) United States Patent
Huang et al.

(10) Patent No.: US 7,807,207 B2
(45) Date of Patent: Oct. 5, 2010

(54) CHEESE COMPOSITIONS AND RELATED METHODS

(75) Inventors: Victor T. Huang, Brooklyn Center, MN (US); Fern A. Panda, White Bear Lake, MN (US); Erika B. Smith, Champlin, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 776 days.

(21) Appl. No.: 10/715,734

(22) Filed: Nov. 17, 2003

(65) Prior Publication Data

US 2005/0106303 A1 May 19, 2005

(51) Int. Cl.
*A23C 19/00* (2006.01)
(52) U.S. Cl. .................. 426/582; 426/580; 426/656; 426/661
(58) Field of Classification Search ............ 426/580, 426/582, 585, 601, 656, 657, 658, 661
See application file for complete search history.

(56) References Cited

U.S. PATENT DOCUMENTS

| | | | | | |
|---|---|---|---|---|---|
| 3,741,774 | A | * | 6/1973 | Burkwall, Jr. ............. | 426/582 |
| 3,836,677 | A | * | 9/1974 | Freck et al. ............... | 426/103 |
| 4,369,196 | A | | 1/1983 | Sukegawa | |
| 4,499,116 | A | | 2/1985 | Zwiercan et al. | |
| 4,608,265 | A | | 8/1986 | Zwiercan et al. | |
| 4,937,091 | A | | 6/1990 | Zallie et al. | |
| 5,725,676 | A | | 3/1998 | Chiu et al. | |
| 5,807,601 | A | | 9/1998 | Carpenter et al. | |
| 5,932,017 | A | | 8/1999 | Chiu et al. | |
| 6,231,675 | B1 | | 5/2001 | Chiu et al. | |
| 6,322,841 | B1 | | 11/2001 | Jackson et al. | |
| 6,451,121 | B2 | | 9/2002 | Chiu et al. | |

FOREIGN PATENT DOCUMENTS

| | | | |
|---|---|---|---|
| EP | 0 115 617 B1 | 8/1986 | |
| EP | 0 278 179 B1 | 1/1992 | |

OTHER PUBLICATIONS

Mounsey et al., "Characteristics of Imitation Cheese Containing Native Starches," *Journal of Food Science*, vol. 66, No. 4, pp. 586-591, 2001.
Fox et al., "Processed Cheese and Substitute or Imitation Cheese Products," *Fundamentals of Cheese Science*, Aspen Publishers, Inc., Chapter 18, pp. 429-451, 2000.
"Cheese analog contains protein from four sources—dairy, oilseed, cereal, leaf," Food *Processing*, vol. 42, No. 11, pp. 28-29, Oct. 1981.
Hesser, "Wheat Gluten—A Natural Protein for the Future—Today," *Amino Acid Composition and Biological Value of Cereal Proteins*, Proceedings of the International Association for Cereal Chemistry Symposium on Amino Acid Compositions and Biological Value of Cereal Proteins, pp. 529-542, Budapest, Hungary, 1983.
Magnuson, "Uses and Functionality of Vital Wheat Gluten," *Cereal Foods World*, vol. 30, No. 2, pp. 179-181, 1985.
Hesser, "World Food Uses of Vital Wheat Gluten," *Vegetable Protein Utilization in Human Foods and Animal Feedstuffs, Proceedings of the World Congress*, pp. 116-122, 1989.

* cited by examiner

*Primary Examiner*—Leslie Wong
(74) *Attorney, Agent, or Firm*—Arlene L. Hornilla; Paul J. Parins; Paul J. Haun (57) ABSTRACT

The present invention relates to cheese compositions and methods of making cheese compositions, including methods of formulating cheese compositions. Cheese compositions of the present invention include casein protein, non-casein protein, and non-pregelatinized, modified starch. Methods of making cheese compositions according to the present invention relate to making cheese compositions that include casein protein, non-casein protein, and non-pregelatinized, modified starch. Methods of formulating cheese compositions of the present invention include reducing an amount casein protein by replacing it with an amount of non-pregelatinized, modified starch and an amount of non-casein protein.

23 Claims, 3 Drawing Sheets

CHEESE COMPOSITIONS AND RELATED METHODS

FIELD OF INVENTION

The present invention relates to cheese compositions and methods of making cheese compositions, including methods of formulating cheese compositions. In particular, the present invention is directed to cheese compositions at a stage during manufacture and/or cheese compositions in final cheese products that include casein protein, non-casein protein, and non-pregelatinized, modified starch, and methods of making same. The present invention is also particularly directed to formulating cheese compositions that have a reduced amount of casein protein. Preferred modified starch includes non-pregelatinized, thermally-inhibited starch and preferred non-casein protein includes vital wheat gluten.

BACKGROUND OF THE INVENTION

Economic incentives can result by replacing or substituting an amount (e.g., either complete or partial replacement) of one or more certain ingredients in cheese compositions with other, less expensive, ingredients.

However, replacing a conventional cheese composition ingredient can present one or more technical hurdles because cheese compositions are complex compositions and their properties can be sensitive to the presence and/or amount of certain ingredients. Thus, conventional cheese manufacturing has come to rely on certain cheese composition ingredients to provide certain properties. Exemplary technical challenges include finding a substitute ingredient that can provide a cheese composition with one or more suitable functional properties (e.g., melt, stretch, and firmness), organoleptic properties (e.g., texture and flavor), and nutritional properties.

One ingredient that can be reduced in quantity by using a less expensive ingredient includes casein protein. Casein protein is a protein, naturally found in milk that can provide a cheese composition with one or more of functional, organoleptic, and nutritional properties.

Casein protein can be replaced (e.g., reduced in amount) by substituting an amount of a certain type of casein in a cheese composition with an amount of certain type of starch.

However, the ability to replace casein protein with starch can be significantly limited depending on the desired functional, organoleptic, and/or nutritional properties of the cheese composition.

For example, replacing casein with starch can provide a cheese composition with less than desired functional properties (e.g., melt, stretch, and firmness) because starch is not necessarily always a "functional" replacement of casein protein, but can merely replace a certain mass of casein protein. Similarly, starch can impart a different, sometimes less desirable, flavor and/or texture to the cheese composition than provided by casein. And replacing casein protein with starch, a carbohydrate, can significantly alter the nutritional characteristics of a cheese composition (e.g., the cheese composition may not satisfy nutritional standards imposed by the United States Department of Agriculture). Thus, conventional cheese making has come to rely on the mere presence and sometimes quantity of casein protein to provide certain cheese composition properties.

Despite these limitations, there exists a strong desire (e.g., economic incentives) to further reduce the amount of casein protein in certain cheese compositions. However, providing suitable functional, organoleptic, and nutritional characteristics while reducing the casein protein even further in certain cheese compositions presents significant technical challenges.

SUMMARY OF THE INVENTION

The present invention provides cheese compositions having unconventionally reduced amounts of casein protein while providing one or more suitable functional, organoleptic, and nutritional properties. Cheese compositions of the present invention are characterized as having an amount of casein protein replaced with a combination of ingredients including an amount of non-casein protein (e.g., non-dairy protein such as vital wheat gluten) and an amount of non-pregelatinized, modified starch (e.g., non-pregelatinized, thermally-inhibited starch). Significantly, cheese compositions of the present invention are characterized as having one or more suitable functional, organoleptic, and nutritional properties even as the level of casein protein is reduced to levels otherwise known to decrease such desired properties. Suitable functional qualities of a cheese composition of the present invention can include qualities typical of any given cheese composition. For example, important qualities of certain mozzarella cheese compositions used on pizza can include machinability during manufacture, depositing performance, freeze/thaw stability, melt, stretch, pizza bake performance, taste, and color. Other important qualities include qualities of a cheese composition during one or more stages of processing such as, for example, emulsification. Additionally, cheese compositions of the present invention can be less sensitive to casein protein quality in that emulsification during cheese processing can be enhanced by use of one or more particular starches such as non-pregelatinized, thermally-inhibited starch.

The present invention also provides methods of making, including formulating, such cheese compositions.

DETAILED DESCRIPTION

In general, cheese compositions may be classified as natural cheese compositions (also sometimes referred to as real or traditional cheese compositions) or non-natural cheese compositions. However, the classification of cheese compositions may vary within the cheese industry.

As used herein, the term "cheese composition" refers to a composition used to make cheese product or the final product of cheese itself. For example, "cheese composition" could refer to a composition during one or more stages of cheese manufacturing, such as when cheese composition ingredients are being mixed together. As another example, "cheese composition" could refer a mixture of cheese ingredients being mixed and heated. Or, as yet another example, "cheese composition" could refer to a composition that is in the form of a final cheese product, ready to be sold for human consumption.

Natural cheese compositions can be characterized as being made directly from milk. Moreover, the United States Department of Agriculture (USDA) has specific standards for natural cheese compositions including ingredients used, manufacturing procedures used, and final nutritional value. Natural cheese is well known and is commercially available.

Non-natural cheese compositions can include substitute cheese compositions, process cheese substitutes, and imitation cheese compositions.

In the United States, and as used herein, a "substitute cheese composition," means a product that is a substitute for, and resembles another cheese, but is not nutritionally inferior. A substitute cheese is not made directly from milk and is not made entirely from dairy ingredients.

As used herein, an "imitation cheese" composition means a cheese composition which can resemble another cheese but is nutritionally inferior.

With this in mind, the present invention provides cheese compositions having unconventionally reduced amounts of casein protein while providing one or more suitable functional, organoleptic, and nutritional properties. Cheese compositions of the present invention are characterized as having an amount of casein protein replaced with a combination of ingredients including an amount of non-casein protein (e.g., non-dairy protein such as vital wheat gluten) and an amount of non-pregelatinized, modified starch (e.g., non-pregelatinized, thermally-inhibited starch). Significantly, cheese compositions of the present invention are characterized as having one or more suitable functional, organoleptic, and nutritional properties even as the level of casein protein is reduced to levels otherwise known to decrease such desired properties. Applicants' inventive cheese composition is not necessarily limited to one or more specific cheese composition classification(s), but is directed to a cheese composition generally, wherein it is desired to reduce the casein protein level while providing or maintaining one or more suitable functional, organoleptic, or nutritional properties. Preferred cheese compositions of the present invention are "substitute cheese" compositions and "imitation cheese" compositions.

In general, cheese compositions of the present invention include mozzarella cheese compositions, cheddar cheese compositions, American cheese compositions, and the like. Preferred cheese compositions include mozzarella substitute cheese compositions. Cheese compositions of the present invention can be combined with other ingredients to produce other food products such as, for example, pizza products (e.g., pizza and pizza rolls). Also, cheese compositions tend to be very useful in frozen food compositions generally. Preferred food products include frozen pizza products such as frozen pizza and frozen pizza rolls that include mozzarella substitute cheese compositions of the present invention.

In general, cheese compositions of the present invention can include protein, fat, non-pregelatinized, modified starch, emulsifying salt, and water. Alternatively, cheese compositions of the present invention can include various other additives.

Fat in cheese compositions can influence texture and melting characteristics of the cheese composition. Fat is commonly known as fat, shortening, or oil. Fat can be either liquid or solid at room temperature, or a combination of liquid and solid at room temperature. Useful fat ingredients can include vegetable fat, dairy fat, or combinations thereof. As described in certain embodiments of the present invention, fat is typically vegetable fat.

Exemplary fat ingredient includes hydrogenated coconut, cottonseed, soybean, groundnut, palm kernel, corn, canola, safflower and combinations thereof. These fat ingredients are well known in the cheese industry and are commercially available.

A useful amount of fat in a cheese composition of the present invention includes an amount that provides suitable properties such as cheese composition texture and melting properties. Such an amount can be in a range from about 15 to about 35% by weight of the total cheese composition, more preferred is an amount in a range from about 20 to about 30% by weight of the total cheese composition.

Protein can significantly influence one or more of functional, organoleptic, or nutritional properties of a cheese composition because it generally forms a three-dimensional network within a cheese composition. For example, protein can influence melt, stretch, machinability, depositing performance, freeze/thaw stability, pizza bake performance, taste, and color characteristics of a cheese composition. Protein can also influence nutritional characteristics. Proteins that can be used in cheese compositions include dairy proteins like casein protein. Other, non-casein and/or non-dairy proteins can also be used in cheese compositions like vital wheat gluten protein.

Casein protein is an edible protein, that can be found naturally in milk and that is conventionally known to provide many important characteristics in cheese compositions. In fact, it is conventionally thought that a certain amount of casein protein is required to provide certain functional and/or organoleptic properties. As used herein, the term "casein protein" means casein in all its forms, including rennet casein, acid casein, caseinate derivatives, fresh cheese, and dehydrated cheese. In the present invention, the preferred form of casein protein includes rennet casein protein.

Methods of making rennet casein protein are well known. Rennet casein can be produced by precipitation of pasteurized skim milk. The precipitation can be accomplished with use of an enzyme called rennin, which can be of animal or microbial origin. Methods of producing and isolating rennet casein from skim milk are well known. Precipitated rennet casein is typically washed, pressed, dried, ground, sieved, and blended to provide a homogenous powder containing approximately 80% casein protein. Rennet casein can be commercially purchased from Kerry Ingredients, Beloit, Wis.

A useful amount of rennet casein in a cheese composition of the present invention includes an amount that can provide a cheese composition with suitable functional properties, organoleptic properties, nutritional properties, and combinations thereof. Such properties may include melt, stretch, machinability, depositing performance, freeze/thaw stability, pizza bake performance, taste, and color of a cheese composition. Protein may also influence nutritional characteristics. Exemplary useful amounts of casein protein in a cheese composition of the present invention include amounts in a range from 10-20% by weight of the total cheese composition, preferably 11-18% by weight of the total cheese composition, more preferably 12-18% by weight of the total cheese composition, and even more preferably 13-17% by weight of the total cheese composition.

Non-casein protein includes dairy protein, non-dairy protein, or combinations thereof. According to the present invention, non-casein protein and non-pregelatinized, modified starch, in combination, can aid in providing one or more highly desirable functional, organoleptic, or nutritional properties in cheese compositions. Such highly desirable properties can be similar to those conventionally thought only obtainable by using an unreduced amount of casein protein. That is, non-casein protein, in combination with non-pregelatinized, modified starch, can unconventionally replace an amount of casein protein (i.e., act as substitute for casein protein). Non-casein protein can also be conventionally used in cheese compositions of the present invention. Preferred non-casein protein includes non-dairy protein.

Non-casein, dairy protein includes protein naturally found in milk. Exemplary non-casein, dairy protein includes whey protein (e.g., whey protein concentrate or isolate).

Suitable non-casein, non-dairy protein includes gluten protein (e.g., vital wheat gluten protein), soy protein, wheat protein, and wheat protein isolate. Preferably, non-casein, non-dairy protein is used in the present invention, in combination with non-pregelatinized, modified starch, to make-up for shortcomings in functional, organoleptic, and/or nutritional properties in cheese compositions that result from a reduced amount of casein protein. Preferred non-casein, non-dairy protein includes vital wheat gluten.

Non-casein, non-dairy proteins useful in the present invention are well known. For example vital wheat gluten is commercially available from ADM Food Ingredients, Olathe, Kans., under the trade designation PROVIM ESP. Vital wheat gluten contains approximately 69% gluten protein.

A useful amount of non-casein protein in a cheese composition of the present invention includes a "casein-replacing amount of non-casein protein." As used herein a "casein-replacing amount of non-casein protein" means an amount of non-casein protein that, in combination with a suitable non-pregelatinized, modified starch (e.g., non-pregelatinized, thermally-inhibited starch), replaces a given amount of casein protein and provides one or more suitable functional, organoleptic, and nutritional properties. When non-dairy protein is used to replace casein protein, a useful amount of non-dairy protein in a cheese composition of the present invention includes a "casein-replacing amount of non-dairy protein." As used herein, a "casein-replacing amount of non-dairy protein" means an amount of non-dairy protein that, in combination with a suitable non-pregelatinized, modified starch (e.g., non-pregelatinized, thermally-inhibited starch), replaces a given amount of casein protein and provides one or more suitable functional, organoleptic, and nutritional properties. The discovery of the impact that non-casein proteins such as non-dairy proteins can have on cheese compositions has numerous advantages. For example, the ability of non-casein proteins such as vital wheat gluten to provide suitable functionality in cheese compositions provides the ability to unconventionally formulate cheese compositions with reduced amounts of casein protein. Another advantage of this discovery provides the ability to formulate unconventional cheese compositions with reduced amounts of casein protein while providing similar nutritional value as an identical cheese composition having an un-reduced amount of casein protein. Exemplary useful amounts of non-casein protein (including non-dairy protein) in a cheese composition of the present invention include amounts in a range from 1-4% by weight of the total cheese composition, preferably 1-3% by weight of the total cheese composition, and even more preferably 1.0-2.5% by weight of the total cheese composition. In one embodiment, non-casein, non-dairy protein can be present in amount of 1.3% by weight of the total cheese composition. In an alternative embodiment, non-casein protein, especially non-dairy protein, can be present in an amount in a range from 2-3% by weight of the total cheese composition. This latter embodiment can use a non-casein, non-dairy protein that includes 69% protein.

Starch can also influence one or more of functional, organoleptic, or nutritional properties of a cheese composition. Applicants have discovered that certain starches can unconventionally reduce casein protein to unconventional levels when used in combination with non-casein protein (preferably non-dairy protein). That is, Applicants have discovered that casein protein can be reduced to levels conventionally considered to be obtainable only by sacrificing one or more highly desirable functional, organoleptic, or nutritional properties.

In particular, non-pregelatinized, modified starch can be used in the present invention. Exemplary non-pregelatinized, modified starch includes chemically modified starch and thermally-inhibited starch. Preferred non-pregelatinized, modified starch includes non-pregelatinized, thermally-inhibited starch.

As a raw material to be used in making cheese compositions, non-pregelatinized, modified starch is typically procured in the form of starch granules.

As used herein, the term "non-pregelatinized," modified starch granule means a starch granule that is insoluble in cold water and appears birefringent when seen under polarized light with a microscope. Non-pregelatinized, modified starch (also know as cook-up starch) tends to thicken upon heating. Pregelatinized starch tends to develop a higher viscosity too quickly for this application. Preferred raw material starch granules include non-pregelatinized, thermally-inhibited starch granules.

During one or more stages of a cheese-making process, non-pregelatinized, modified starch granules can, and typically do become gelatinized. Gelatinization is a series of changes that starch undergoes when heated in excess water, which solubilizes the starch and results in increased viscosity and disappearance of birefringence.

Also, during one or more stages of a cheese-making process, non-pregelatinized, modified starch granules can breakdown or reduce in size to a certain degree during processing as the result of one or more of heating, mixing, and shearing the granule in a cheese composition. Applicants have discovered that a non-pregelatinized, modified starch that is resistant to such breakdown tends to provide suitable viscosity characteristics during processing. Such a non-pregelatinized, modified starch is likely to satisfy the Starch Viscosity Test (described below). The resistance to granule breakdown results in a starch granule in the final cheese composition that is relatively larger in size (e.g., larger cross-sectional area) as compared to a starch granule that is not as resistant to such breakdown during processing.

Figure 1:
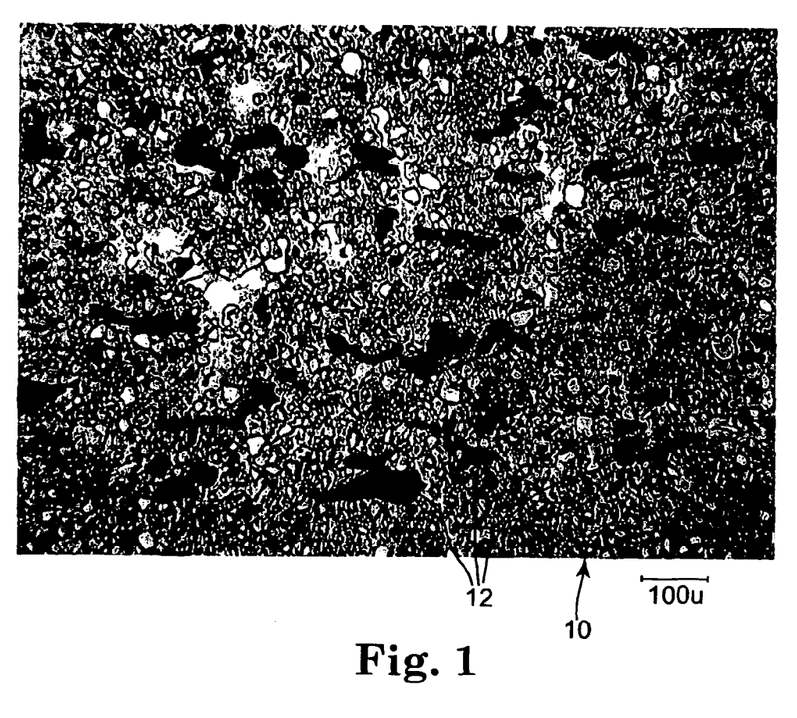
FIG. 1 is a photomicrograph of a cross-sectional view of a cheese composition of the present invention that includes non-pregelatinized, thermally-inhibited starch.
Figure 2:
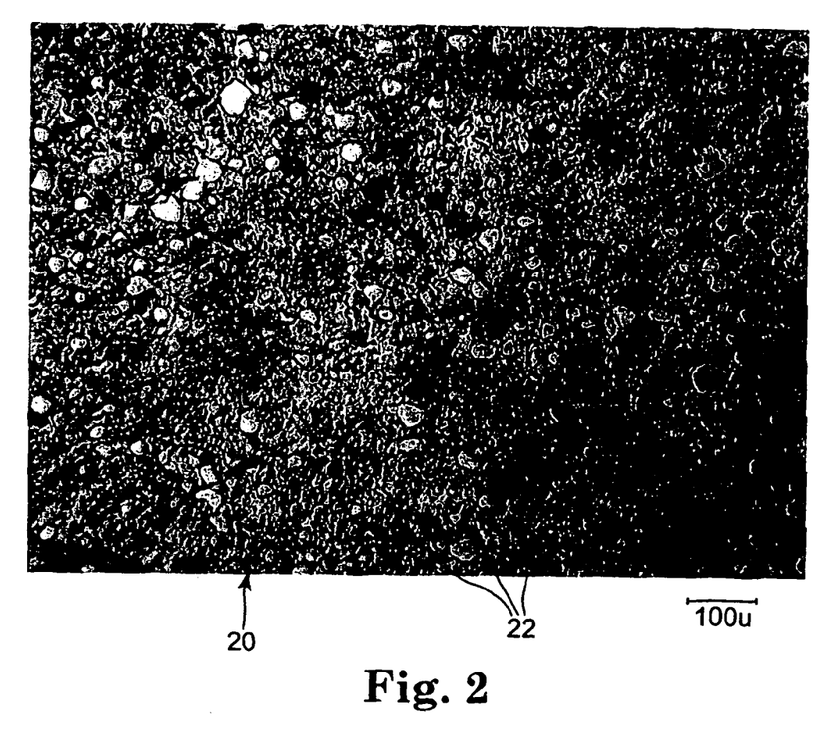
FIG. 2 is a photomicrograph of a cross-sectional view of a comparative cheese composition that includes chemically-modified starch.

FIG. 1 illustrates a cheese composition of the present invention and FIG. 2 illustrates a comparative cheese composition. FIGS. 1 and 2 illustrate two cheese compositions that are identical except that the cheese in FIG. 1 includes the combination of non-pregelatinized, thermally-inhibited starch and gluten protein to reduce an amount of casein protein, whereas, the cheese in FIG. 2 includes a chemically modified starch which does not satisfy the Starch Viscosity Test (described below) and does not include the gluten protein. The effective diameter of the starting raw material starches used in FIGS. 1 and 2 were roughly identical.

FIG. 1 is a photomicrograph of a cheese composition 10 using a non-pregelatinized, thermally-inhibited starch (obtained from National Starch and Chemical Company, Bridgewater, N.J., under the trade designation NOVATION 1600) and a non-casein protein (obtained from ADM Food Ingredients under the trade designation PROVIM ESP GLUTEN). Here, the starch granules 12 remain largely intact after processing (e.g., heating and mixing). The starch granules 12 (shown in black) are stained in dark blue from iodine and have a mean area of 780 square micrometers. The average equivalent diameter is 27 micrometers. Equivalent diameter (ED) is a diameter the granule would have if the granule were round. ED can be calculated as two (2) times the square root of the area divided by Pi as follows:

$$ED = 2 \times \sqrt{\frac{Area}{\pi}}.$$

FIG. 2 is a photomicrograph of a comparative cheese composition 20 using a particular chemically-modified starch that does not satisfy the Starch Viscosity Test (described below). Here, the starch granules 22 have degraded relatively more after processing (e.g., heating and mixing) than the non-pregelatinized, thermally-inhibited starch granules used in FIG. 1. The starch granules 22 are stained in dark blue from iodine and have a mean area of 239 square micrometers. The average equivalent diameter is 16 micrometers.

The average granule areas in FIGS. 1 and 2 were obtained using the method for microscopic examination described below. A ½" cube was cut from each cheese sample and frozen. These samples were cut into 20 micrometer sections with a cryostatic microtome. The sections were stained with an aqueous iodine solution. The starch used in these cheeses stains dark blue. Representative fields were imaged in a microscope (obtained from Carl Zeiss International, Oberkochen, Germany under the trade designation ZEISS UNIVERSAL) using transmitted light. Images were acquired with a camera (obtained from Sony Corporation, Tokyo, Japan having model number 760 CCD). The mean starch area was determined with an image analyzer (obtained from Leica Camera AG, Solms, Germany, having model number Leica QWin 550).

Non-pregelatinized, thermally-inhibited starch granules can exhibit an advantageously high resistance to breakdown, e.g., breakdown as the result of heating and/or mixing the granule in a cheese composition. Although not wishing to be bound by theory, it is believed that non-pregelatinized, thermally-inhibited starch tends to improve the internal strength of starch granules which tends to make the starch granules more resistant to physical and/or thermal degradation during one or more cheese making processes. Such resistance to granule degradation can beneficially result in improved processing conditions such as improving cheese composition viscosity during mixing and heating.

Based on this, it is believed that other starch granules tending to have improved internal strength would be expected to work in cheese compositions of the present invention. For example, non-pregelatinized, chemically modified starch granules (e.g., non-pregelatinized, cross-linked starch granules) having similar improved internal strength would be expected to work in cheese compositions of the present invention. And, in fact, an example in the Examples sections shows that non-pregelatinized, chemically-modified starch can work in the present invention.

One method of determining starches useful in the present invention is to determine if they satisfy the Starch Viscosity Test, which is described below. Because suitable internal strength (i.e., suitable resistance to granule breakdown) of starch granules is thought to be correlated to desirable viscosity characteristics of a cheese composition of the present invention, the Starch Viscosity Test is thought to be a measure of the internal strength of a starch granule.

Starch Viscosity Test

The Starch Viscosity Test can be employed using a Brabender VISCO-AMYLOGRAPH instrument (obtained from C. W. Brabender Instrument, Inc., South Hackensack, N.J.) capable of 75 rpm with a 700 cm gm cartridge. Prior to the Starch Viscosity Test, the starch is analyzed for moisture, so appropriate adjustments due to moisture can be made. For this test, 5% by weight of the total test suspension of starch dry solids are used. To obtain this, 25 grams of starch (dry basis) are weighed and transferred to a beaker. Distilled water is added to provide a total weight of 400 grams to suspend the starch. The suspension is poured into a viscograph bowl. The pH of the suspension is adjusted to 6 via addition of dilute HCl or NaOH. The beaker is rinsed with 100 grams of distilled water minus the weight of the water used for the pH adjustment (total test suspension weight is 500 g). The VISCO-AMYLOGRAPH is started and records viscosity in Brabender units throughout the following heating schedule:

Step 1: Heat suspension at 1.5° C./min from 25 to 95° C. while stirring at 75 rpm, Step 2: Hold starch at 95° C. while stirring for 15 minutes, and Step 3: Cool to 50° C. at 1.5° C./min while stirring.

A starch that satisfies the Starch Viscosity Test is a non-pregelatinized, modified starch that when heated, in a Brabender VISCO-AMYLOGRAPH with a 5% dry solids starch solution having a pH of 6, from 25° C. to 95° C. at a rate of 1.5° C./min exhibits a viscosity in the range from about 100 to about 1200 Brabender units at time=0 (i.e., beginning of the hold period) and exhibits a viscosity in a range from about 200 to about 1400 Brabender units after a 15 minute hold at 95° C.

Figure 3:
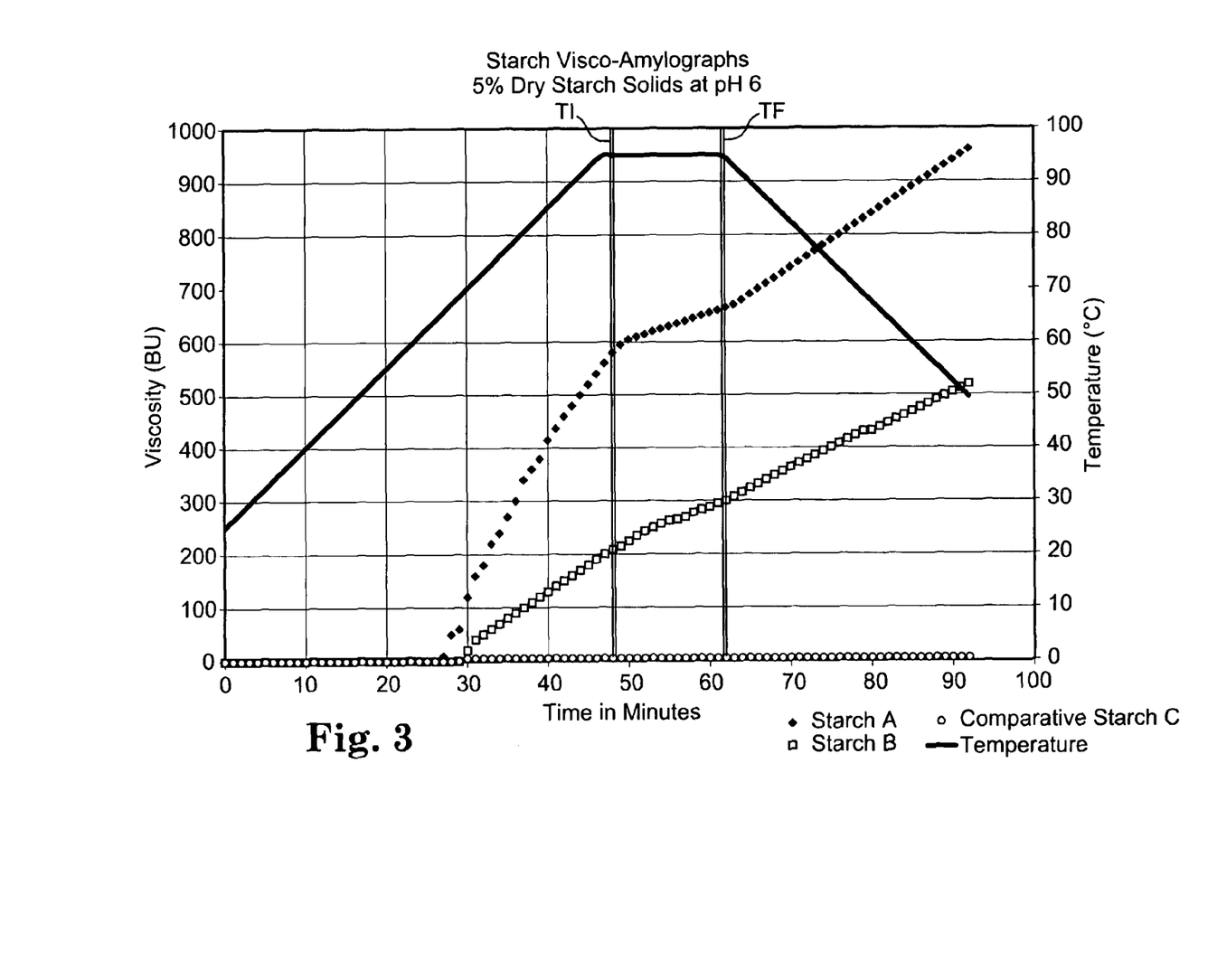
FIG. 3 is a graph showing the results of various starches used in the Starch Viscosity Test.

FIG. 3 illustrates the results of certain starches tested according to the Starch Viscosity Test. "TI" is the beginning of the hold period and "TF" is the end of the hold period. The comparative starch C is a chemically modified starch that does not satisfy the Starch Viscosity Test parameters according to the present invention. This starch is the same starch illustrated in FIG. 2 and used as comparative Example 1 in the Examples section. Example Starch A is thermally inhibited potato starch that satisfies the Starch Viscosity Test and is within this invention (this starch is the same starch illustrated in FIG. 1). Starch B is a chemically modified potato starch that satisfies the Starch Viscosity Test and is within this invention.

Thermally-inhibited starch and methods for making it are known and described in U.S. Pat. Nos. 5,725,676; 5,932,017; 6,231,675, the disclosures of which are incorporated herein by reference.

Non-pregelatinized, thermally-inhibited starch is commercially available from National Starch and Chemical Company, Bridgewater, N.J., under the trade designation NOVATION 1600.

Suitable amounts of non-pregelatinized, modified starch in the present invention include a "casein-replacing amount of non-pregelatinized, modified starch." As used herein, a "casein-replacing amount of non-pregelatinized, modified starch" means an amount that would, in combination with a non-casein protein, provide one or more suitable functional and organoleptic properties in a cheese composition. For example, a suitable amount of non-pregelatinized, modified starch can provide similar, if not better, functional characteristics as a given amount of casein protein. Advantageously, such suitable amounts of non-pregelatinized, modified starch provide the ability to formulate cheese compositions with reduced amounts of casein protein because such starch, especially in combination with an amount of non-casein protein, can act as a casein protein substitute. Similarly, as used herein, a "casein-replacing amount of non-pregelatinized, thermally-inhibited starch" means an amount that would, in combination with a non-casein protein, provide one or more suitable functional and organoleptic properties in a cheese composition. Exemplary, suitable amounts of non-pregelatinized, modified starch (e.g., non-pregelatinized, thermally-inhibited starch) include amounts in a range from 1-6% by weight of the total cheese composition, more preferably 2-5%, and even more preferred 2.5-3.5%.

Non-pregelatinized, modified starch can be procured from one or more sources such as corn, potato, sweet potato, wheat, rice, sago, tapioca, and sorghum. Preferred non-pregelatinized, modified starch includes potato starch. Potato starch tends to provide cheese compositions with suitable organoleptic properties such as taste and texture.

One or more emulsifying salts in a cheese composition formulation allow the casein protein to become hydrated.

Exemplary emulsifying salt for use in cheese compositions of the present invention include monosodium phosphate, disodium phosphate, dipotassium phosphate, trisodium phosphate, sodium metaphosphate (sodium hexametaphosphate), sodium acid pyrophosphate, tetrasodium pyrophosphate, sodium aluminum phosphate, sodium citrate, potassium citrate, calcium citrate, sodium tartrate, sodium potassium tartrate, and combinations thereof. Preferred emulsifying salt includes one or more of trisodium phosphate, sodium citrate, alkaline sodium aluminum phosphate, and dibasic sodium phosphate.

Emulsifying salt and methods of making the same for use in cheese compositions are well known. One useful emulsifying salt is commercially available from Rhodia Food, Cranbury, N.J., under the trade designation KASAL. KASAL is an emulsifying salt blend of about 70% alkaline sodium aluminum phosphate and about 30% dibasic sodium phosphate.

Exemplary amounts of emulsifying salt in cheese compositions of the present invention include an amount less than about 3% by weight of the total cheese composition, preferably less than about 2% by weight of the total cheese composition. In one embodiment, the total amount of one or more emulsifying salts is about 1.9% by weight of the total cheese composition.

Water is preferably used in cheese compositions of the present invention. An exemplary amount of water includes an amount of water in the range from about 45% to about 55%, by weight of the total cheese composition.

One or more optional ingredients known in the art may be used with cheese compositions of the present invention. Such optional ingredients include acidifying agent, cream, milkfat, cream, milk, salt, harmless artificial coloring, spices or flavorings, mold-inhibitor, nutritional supplements, gums, organic emulsifiers, and other types of cheese than the given cheese composition.

Acidifying agent can include one or more of vinegar, lactic acid, citric acid, acetic acid, and phosphoric acid.

Mold inhibitor can include one or more of the following in a total amount of no more than about 0.2% by weight of the total cheese composition: sorbic acid, potassium sorbate, and sodium sorbate. Mold inhibitor can also include one or more of the following in a total amount of no more than about 0.3% by weight of the total cheese composition: sodium propionate, calcium propionate. Mold inhibitor can also include nisin.

The present invention includes methods of making, including methods of formulating, cheese compositions.

In accordance with the present invention, it has been discovered that cheese compositions with one or more suitable functional, organoleptic, and/or nutritional characteristics can be formulated with casein protein, non-casein protein and non-pregelatinized, modified starch. In preferred methods, cheese compositions are formulated with vital wheat gluten protein and non-pregelatinized, thermally-inhibited starch.

As mentioned, reducing the amount of casein protein in cheese compositions is desirable for certain cheese compositions. Conventionally, casein protein can be reduced by substituting an amount of casein protein with an amount of certain starches. With such starches, casein protein can be conventionally substituted by starch to a limited extent if certain functional, organoleptic, and/or nutritional characteristics are to be provided. In accordance with the present invention, it has been discovered that casein protein can be successfully reduced even further than conventional means by substituting a given amount of casein protein with a suitable amount of non-pregelatinized, modified starch (e.g., non-pregelatinized, thermally-inhibited starch) and non-casein protein (e.g., vital wheat gluten) so that suitable unsubstituted, casein-like characteristics of the cheese composition are achieved. In other words, the present invention includes a method of formulating a cheese composition that includes reducing an amount of casein protein in a cheese composition by incorporating both a non-casein protein and non-pregelatinized, modified starch into a cheese composition to replace an amount of casein protein.

In a preferred embodiment, a method of formulating a cheese composition includes the step of reducing an amount of a casein protein in a formulation by incorporating a non-casein protein into the formulation for the composition based upon information comprising functional characteristics of the non-casein protein and by incorporating a non-pregelatinized, modified starch into the formulation for the composition based upon information comprising data indicative of a viscosity characteristic of the non-pregelatinized, modified starch. Viscosity characteristics of a non-pregelatinized, modified starch can be readily obtained using well-known methods. Preferably, viscosity data is obtained for non-pregelatinized, modified starch using the Starch Viscosity Test described above.

In a preferred embodiment, a method of formulation includes formulating the casein protein in an amount in a range from 10-20% by weight of the total cheese composition, the non-casein protein in an amount in a range from 1-4% by weight of the total cheese composition, and the non-pregelatinized, modified starch in an amount in a range from 1-6% by weight of the total cheese composition.

Reducing an amount of a casein protein in a formulation by incorporating a non-casein protein into the formulation for the composition can also be based upon information including nutritional characteristics of the non-casein protein (e.g., using a non-casein protein that has similar nutritional characteristics as a casein protein).

The present invention also includes methods of making cheese compositions that include the steps of formulating cheese composition ingredients including fat, a casein-replacing amount of non-casein protein, a casein-replacing amount of non-pregelatinized, modified starch, emulsifying salt, and water, combining the ingredients, followed by mixing, heating, and cooling to form a cheese composition. In one embodiment, the non-pregelatinized, modified starch includes non-pregelatinized, thermally-inhibited, potato starch. In another embodiment, the non-casein protein includes vital wheat gluten.

Methods of making a cheese composition of the present invention generally utilize a cheese cooker, which are commercially available and well known. An example of such a cooker includes a variable speed, twin screw, steam injected cheese cooker from Custom Stainless Steel Equipment, Santa Rosa, Calif., having model CDB-0412FJD.

In general, the cheese cooker system is allowed to warm up. Next, ingredients are added to the cooker and the ingredients are heated. Ingredients can be added in one group, or at different times. The ingredients are then mixed, while the temperature is maintained at an elevated state. The ingredients are then cooled to form a final cheese composition product. A more specific description of an example of how a cheese composition of the present invention can be made using a cheese cooker having model number CDB-0412FJD from Custom Stainless Steel Equipment, Santa Rosa, Calif., is given below.

First the cheese cooker can be readied by setting the steam to a pressure of about 40 psi. Condensate valves can then be opened to allow the steam to flow through the pipes. Once the condensate has been cleared, the steam is directed through the cheese cooker by closing the steam outlet valve. The steam is sent through the injection ports to ensure that the ports are open and unplugged.

The cover to the mixer portion of the cheese cooker is then closed and the cheese cooker is allowed to warm up. After the mixer has been sufficiently heated, the steam valves on the cheese cooker are closed. Some of the ingredients, if necessary, can be mixed separately, or melted. For example, if semi-solid shortening is used, it may need to be melted before being added to the cooker. Typically, water is added to the cooker and allowed to warm to a desired temperature before adding other ingredients.

The steam drain valves on the cheese cooker are opened again to clear condensate, the impellers are started and the water is added to the cooker. The steam valves are then opened and steam is allowed to enter the cooker through the injection ports. The cover is closed and the temperature is allowed to rise to a temperature in the range from about 175° F. to about 200° F. (about 79° C. to about 93° C.) while mixing is maintained.

Once the water is heated, emulsifier salt can be added and allowed to dissolve before the separately mixed portion(s) are added to the cheese cooker. The impeller speed is controlled to ensure proper mixing. If the temperature of the ingredients has lowered, the ingredients are heated to a temperature in the range from 175° F. to 185° F. (about 79° C. to about 85° C.) by closing the mixer cover and adding more steam to the cooker. Caution should be taken in order to prevent addition of an excessive amount of steam, which could cause addition of too much water to the overall mixture. The steam is then shut off and the cover opened to allow visual confirmation of a final cheese composition product. The mixer should remain running in order to obtain a homogenous mixture. The temperature should be maintained at about 170° F. (about 76° C.). The cheese should begin to solidify and a creamy texture should result. The transformation should occur between 2 and 8 minutes after the last ingredient has been added to the cooker. When the formation of the cheese is complete, the molten cheese is drained into an appropriate container. The final cheese composition can then cool to a temperature in the range from about 32° F. to about 40° F. (about 0° C. to about 5° C.) and can then be further processed if desired.

Cheese compositions of the present invention are typically used as edible food products and/or are further processed and ultimately formed into cheese compositions that can be used as edible food products. Cheese compositions can be used at one or more stages during cheese manufacturing such as, as described above, mixing, heating, and cooling cheese compositions.

Final cheese products of the present invention can be packaged alone or combined with other food products before packaging. Final cheese products packaged alone include string cheese, shredded cheese (e.g., shredded mozzarella cheese and shredded cheddar cheese), and block cheese. Final cheese products can be combined with other food products before being packaged. Such cheese products can be incorporated or combined with other food products in any suitable way. For example, final cheese products of the present invention can be applied in any suitable form (e.g., shredded) onto other food products such as pizza by any suitable, conventional means. As another example, final cheese products of the present invention can be injected in any suitable form into other food products such as pizza rolls by any suitable, conventional means. Cheese compositions of the present invention can also be packaged, alone or in combination with other food ingredients, frozen, and sold for delayed consumption.

Representative embodiments of the present invention will now be described with reference to the following examples that illustrate the principles and practice of the present invention.

EXAMPLES

Example 1-1 illustrates how casein protein content in a substitute cheese composition can be reduced by adding in an amount of non-casein protein (e.g., vital wheat gluten) and non-pregelatinized, thermally-inhibited starch. Example 1-2 illustrates how casein protein content in a substitute cheese composition can be reduced by adding in an amount of non-casein protein (e.g., vital wheat gluten) and non-pregelatinized, chemically modified starch. Example 1-1 corresponds to Starch A in FIG. 3, while Example 1-2 utilizes Starch B in FIG. 3. The composition of Comparative Example 1 is not included within this invention and utilizes Comparative Starch C in FIG. 3.

TABLE 1

Compositions of Examples in Example 1

|  | Comparative Example 1 | Example 1-1 | Example 1-2 |
|---|---|---|---|
| Stage 1 | | | |
| Water plus steam | 46.50% | 46.50% | 46.50% |
| Stage 2 | | | |
| KASAL | 1.60% | 1.60% | 1.60% |
| Sodium citrate | 0.20% | 0.20% | 0.20% |
| Tri sodium phosphate | 0.20% | 0.20% | 0.20% |
| Stage 3 | | | |
| Rennet Casein | 19.30% | 17.50% | 17.50% |
| Vital Wheat Gluten | | 2.00% | 2.00% |
| Soy Oil | 25.80% | 26.10% | 26.10% |
| Salt (NaCl) | 1.00% | 1.00% | 1.00% |
| Potato Starch C | 3.30% | | |
| Potato Starch A | | 2.80% | |
| Potato Starch B | | | 2.80% |
| Potassium Chloride (KCl) | 0.90% | 0.90% | 0.90% |
| Citric Acid | 0.50% | 0.50% | 0.50% |
| Potassium sorbate | 0.20% | 0.20% | 0.20% |
| Vitamin/mineral blend | 0.05% | 0.05% | 0.05% |
| Total | 100.00% | 100.00% | 100.00% |

TABLE 2

Source of Ingredients in TABLE 1

| Ingredient | Product Name | Company |
|---|---|---|
| 70% Sodium Aluminum phosphate & 30% Sodium Phosphate | KASAL | Rhodia Food, Cranbury, NJ |
| Sodium Citrate | | A. E. Staley Mfg. Co., Decatur, IL |
| Tri-Sodium Phosphate | | Rhodia Food, Cranbury, NJ |
| Rennet casein | | Kerry Ingredients, Beloit, WI |
| Vital Wheat Gluten | PROVIM | ADM Food Ingredients, Keokuk, IA |
| Soy Oil | ESP | A. C. Humko, Columbus, OH |
| Salt (NaCl) | | Morton International, Inc of Rohm and Haas, Philadelphia, PA |
| Modified Potato Starch | PENBIND 850 | Penford Food Ingredients, Englewood, CO |
| Thermally Inhibited Potato Starch | NOVATION 1600 | National Starch and Chemical Co, Bridgewater, NJ |
| Modified Potato Starch | PENCLING 580 | Penford Food Ingredients, Englewood, CO |
| Potassium Chloride (KCl) | | Morton International, Inc of Rohm and Haas, Philadelphia, PA |
| Citric Acid | | A. E. Staley Mfg. Co., Decatur, IL |
| Potassium Sorbate | | Chisso Corp, Tokyo, Japan |
| Vitamin Mineral Blend | | Watson Foods Co., Inc., West Haven, CT |

The cheese compositions in Example 1 were prepared according to the procedure described below. A 5 kg cheese cooker (obtained from Custom Stainless Steel Equipment, Santa Rosa, Calif., having model number CDB-0412FJD) was used. The stage two emulsifying salts (KASAL, sodium citrate, and tri-sodium phosphate) were weighed separately and temporarily kept aside. The casein blend ingredients (stage 3 ingredients) were weighed and combined together. The main steam valve on the cooker was opened to allow steam to go through injection ports in the cooker to warm the cooker and drain condensate. The water ingredient was weighed, poured into the cooker, and heated to 175° F. After heating the water, the emulsifying salts (stage 2 ingredients) were added to the water. The casein blend ingredients (stage 3 ingredients) were separately mixed and warmed to 110° F. The fat in the casein blend should have been melted after mixing the casein blend at 110° F. Then the casein blend was added to the cooker and timing started. The mixing speed on the cooker was set to medium-high. The ingredients in the cooker were heated to 180° F. After heating the cheese ingredients, the steam was turned down. The mixture should never go above 185° F., but the steam valve was periodically adjusted so that the temperature of the mixture was maintained at about 175° F. At the beginning of mixing, the cheese tends to be grainy, but becomes smooth as mixing proceeds. The final cheese composition product was formed when the mixture became very thick and strands and air bubbles formed. After the final cheese composition formed, it was cooked for about one (1) minute longer. Then the steam and mixing impellers are turned off and time recorded. The cheese can then be drained from the cooker into an appropriate container and covered. The final cheese composition was stored in the refrigerator and evaluated the next day.

As can be seen, Example 1-1 has a reduced amount of casein protein (as compared to Comparative Example 1) by adding in an amount of vital wheat gluten protein and non-pregelatinized, thermally-inhibited starch. Example 1-2 has a reduced amount of casein protein (as compared to Comparative Example 1) and uses chemically modified starch. The cheese compositions were evaluated for certain properties (e.g., cook time, meltability and machinability), and all of the results were found to be acceptable and similar.

All patents, patent documents, and publications cited herein are incorporated by reference as if individually incorporated. Unless otherwise indicated, all parts and percentages are by weight of the total composition. The foregoing detailed description has been given for clarity of understanding only. No unnecessary limitations are to be understood there from. The invention is not limited to the exact details shown and described, for variations obvious to one skilled in the art will be included within the invention defined by the claims.

What is claimed is:

1. A cheese composition comprising:
   fat;
   protein comprising:
     casein protein; and
     a casein-replacing amount of non-casein protein;
   starch consisting essentially of a casein-replacing amount of non-pregelatinized, modified starch;
   emulsifying salt; and
   water.

2. The cheese composition of claim 1, wherein the casein protein is present in an amount in the range from 10-20% by weight of the cheese composition.

3. The cheese composition of claim 1, wherein the non-pregelatinized, modified starch comprises non-pregelatinized, thermally-inhibited starch.

4. The cheese composition of claim 3, wherein the non-pregelatinized, thermally-inhibited starch is present in an amount in the range from 1-6% by weight of the cheese composition.

5. The cheese composition of claim 3, wherein the non-pregelatinized, thermally-inhibited starch comprises non-pregelatinized, thermally-inhibited, potato starch.

6. The cheese composition of claim 1, wherein the non-casein protein comprises non-dairy protein.

7. The cheese composition of claim 6, wherein the non-dairy protein comprises vital wheat gluten protein.

8. The cheese composition of claim 1, wherein the non-casein protein is present in an amount in the range from 1-4% by weight of the cheese composition.

9. The cheese composition of claim 1, wherein the non-pregelatinized, modified starch comprises non-pregelatinized, chemically modified starch.

10. The cheese composition of claim 9, wherein the non-pregelatinized, chemically modified starch is present in an amount in the range from 1-6% by weight of the cheese composition.

11. The cheese composition of claim 9, wherein the non-pregelatinized, chemically modified starch comprises non-pregelatinized, chemically modified, potato starch.

12. The cheese composition of claim 1, wherein the non-pregelatinized, modified starch has a viscosity value, according to the Starch Viscosity Test using 5% dry starch solids, in the range from 100-1200 Brabender units at the beginning of a 95° C. hold period and in the range from 200-1400 Brabender units after 15 minutes from the beginning of the hold period.

13. The cheese composition of claim 1, wherein the casein protein comprises rennet casein protein.

14. The cheese composition of claim 1, wherein the cheese composition is a substitute cheese composition.

15. The cheese composition of claim 1, wherein the cheese composition is an imitation cheese composition.

16. A food product comprising the cheese composition of claim 1.

17. A method of formulating a cheese composition comprising the step of reducing an amount of a casein protein in a formulation comprising:
   the step of incorporating a non-casein protein into the formulation for the composition based upon information comprising functional characteristics of the non-casein protein; and
   the step of incorporating a starch consisting essentially of a non-pregelatinized, modified starch into the formulation for the composition based upon information comprising data indicative of a viscosity characteristic of the non-pregelatinized, modified starch.

18. The method of claim 17, wherein the non-casein protein comprises vital wheat gluten protein.

19. The method of claim 17, wherein the casein protein is formulated in an amount in a range from 10-20% by weight of the total cheese composition, the non-casein protein is formulated in an amount in a range from 1-4% by weight of the total cheese composition, and the non-pregelatinized, modified starch is formulated in an amount in a range from 1-6% by weight of the total cheese composition.

20. The method of claim 17, wherein the step of incorporating a non-casein protein into the formulation for the composition is further based upon information comprising nutritional characteristics of the non-casein protein.

21. A method of making a cheese composition comprising the steps of:
   formulating a cheese composition ingredients comprising:
      fat;
      protein comprising:
         casein protein; and
         a casein-replacing amount of non-casein protein;
      starch consisting essentially of a casein-replacing amount of non-pregelatinized, modified starch;
      emulsifying salt; and
      water;
   combining the ingredients;
   mixing the ingredients to form a mixture; and
   heating and cooling the mixture to provide a cheese composition.

22. The method of claim 21, wherein the non-pregelatinized, modified starch comprises non-pregelatinized, thermally-inhibited, potato starch.

23. The method of claim 21, wherein the non-casein protein comprises vital wheat gluten.

* * * * *